United States Patent Office 3,554,940
Patented Jan. 12, 1971

3,554,940
PRESSURE-SENSITIVE ADHESIVES
Morimasa Arakawa, Osaka-shi, Bunjiro Yamada and Akisato Katanosaka, Nishinomiya-shi, and Kazuhiko Kato, Suita-shi, Japan, assignors to Arakawa Rinsan Kagaku Kogyo Kabushiki Kaisha, Higashi-ku, Osaka-shi, Japan
No Drawing. Filed Jan. 4, 1968, Ser. No. 695,578
Int. Cl. C08d 9/08
U.S. Cl. 260—5                        7 Claims

ABSTRACT OF THE DISCLOSURE

A pressure-sensitive adhesive which comprises 100 weight parts of at least one of natural and synthetic rubbers and 30 to 120 weight parts of a hydrogenated hydrocarbon resin tackifier prepared by polymerizing a cracked petroleum fraction, boiling between −10 and 280° C. and containing unsaturated hydrocarbons at least 50 weight percent of which is at least one of aromatic olefins, cyclic olefins and cyclic diolefins, and hydrogenating the resultant polymer to a hydrogenation rate of at least 40 percent.

---

This invention relates to pressure-sensitive adhesives, particularly to pressure-sensitive adhesives containing specific hydrocarbon resins as a tackifier.

Pressure-sensitive adhesives usually comprise natural or synthetic rubbers and resin tackifiers. The most popular one contains terpene resin as a tackifier, which is excellent in tackiness and adhesion and used widely.

Although many attempts have been made to use various resin tackifiers in the place of terpene resin, there have been provided no pressure-sensitive adhesives superior to those containing terpene resin tackifier. For instance, pressure-sensitive adhesives containing rosin tackifier are inferior in tackiness-retentivity as well as weather- and chemical-resistant properties, as compared with those containing terpene resin tackifier. And further, adhesives of this kind containing aliphatic hydrocarbon resin tackifiers are poor in tackiness due to low compatibility with synthetic rubbers, and if tackiness is to be improved a large amount of plasticizer is required. However, extensive use of plasticizer not only impairs economy but also weakens adhesion of the adhesives.

An object of the invention is to provide a novel tackifier which is no less better than terpene resin tackifier and derived from petroleum resin which are available economically and in abundance.

Another object of the invention is to provide a pressure-sensitive adhesive which has, as compared with the conventional adhesives containing terpene resin tackifiers, tackiness and adhesion equal to or excelling, and are excellent in tackiness-retentivity and weather-resistant property.

Still another object of the invention is to provide pressure-sensitive adhesives which display excellent tackiness without or with a small amount of plasticizer.

Above and other objects of the invention will be apparent from the following description.

These and other objects of the invention are accomplished by a pressure-sensitive adhesive which comprises 100 weight parts of at least one of natural and synthetic rubbers and 30 to 120 weight parts of a hydrogenated hydrocarbon resin tackifier prepared by polymerizing a cracked petroleum fraction, boiling between −10 and 280° C. and containing unsaturated hydrocarbons at least 50 weight percent of which is at least one of aromatic olefins, cyclic olefins and cyclic diolefins, and hydrogenating the resultant polymer to a hydrogenation rate of at least 40 percent.

This invention is based on the new discoveries that the pressure-sensitive adhesives of the invention containing the above specific hydrogenated hydrocarbon resins as a tackifier are excellent in tackiness, tackiness-retentivity, adhesion and weather-resistance almost same as or superior to those of adhesives of this kind containing terpene resins as a tackifier. Although a theoretical reason that the present pressure-sensitive adhesives display the excellent effects has not been made clear, it may be considered that such effects depend upon a specific structure of the resin tackifier of the invention. Namely, the resin tackifier of the invention contains in its molecule alicyclic groups, such as cyclopentane, cyclohexane, etc., due to hydrogenation of the polymer obtained from the fraction containing aromatic olefins, cyclic olefins and/or cyclic diolefins in the specific amount, and in this respect the resin tackifier of the invention is clearly distinguished from the conventional aliphatic hydrocarbon resin tackifier which is inferior to the terpene resin tackifier.

Throughout the specification and claims the word "hydrogenation rate" is defined by the following equation:

$$\text{Hydrogenation rate } (\%) = \frac{a-b}{A-b} \times 100$$

wherein $A$ is weight percent of hydrogen contained in the hydrocarbon resin saturated with hydrogen; $a$ is weight percent of hydrogen contained in the hydrocarbon resin after hydrogenation; and $b$ is weight percent of hydrogen contained in the hydrocarbon resin before hydrogenation: Said weight percentages of hydrogen contained in the resins are sought by elementary analysis of the respective resin, and the weight percent of hydrogen contained in the resin saturated with hydrogen means the maximum amount of hydrogen capable of being added to the resin.

The specific hydrocarbon resin tackifier used in the invention is prepared from petroleum fractions of boiling points ranging from −10 to 280° C. which may be obtained in abundance by cracking or reforming of petroleum naphtha. Such petroleum fractions may contain unsaturated hydrocarbons as a polymerizable component and paraffins and/or alkylbenzenes as a non-polymerizable component. The unsaturated hydrocarbons include (1) aromatic olefins such as styrene, α-methyl styrene, vinyl toluene, vinyl xylene, propenyl benzene, indene, methyl indene, ethyl indene, etc., (2) cyclic olefins and diolefins such as cyclopentene, cyclo pentadiene, dicyclopentadiene, cyclohexene, cyclooctene, etc., and (3) aliphatic olefins and diolefins such as butene, butadiene, pentene, pentadiene, octadiene, etc. The fractions may further contain paraffins, alkylbenzenes and the like non-polymerizable substances.

It has been found that the properties of the resin tackifier of the invention mainly depend upon the starting fraction and hydrogenation rate of the resin, and the selection of both factors lead to attainment of the objects of the invention. It is essential in the invention to use fractions containing aromatic olefins, cyclic olefins and/or cyclic diolefins in at least 50 weight percent based on the weight of unsaturated hydrocarbons contained in the fractions. When fractions containing less than 50 weight percent of aromatic olefins, cyclic olefins and/or cyclic diolefins, i.e., fractions containing more than 50 weight percent of aliphatic olefins and diolefins, based on the weight of unsaturated hydrocarbons contained in the fraction are used, the resin tackifier prepared therefrom can not impart excellent properties to the final pressure-sensitive adhesives. The preferred petroleum fractions used in the invention have boiling points ranging from 130 to 280° C. and contain 60 to 100 weight percent of aromatic olefins, cyclic olefins and/or cyclic diolefins in the unsaturated hydrocarbons contained in the fraction. The saturated hydrocarbons contained in the fractions are utilized as a solvent medium in the polymerization reaction without any adverse affect, so that proportions of unsaturated hydrocarbons to saturated hydrocarbons in the stream are not critical and vary over a wide range, but the proportion in weight of unsaturated hydrocarbons to saturated hydrocarbons between 10 to 70:90 to 30 is preferred.

As far as the fractions have the above boiling point and contain aromatic olefins, cyclic olefins and/or cyclic diolefins in the above range, any fraction can be used. For example, steam- or thermal-cracked fraction may be used as it is, and it may be possible to mix two or more of different distillates or to fractionally distill the fraction to remove a certain kind of distillate.

The above fractions may be polymerized by conventional methods. In one of the preferred methods the polymerization is carried out in organic solvent in the presence of a radical catalyst or Friedel-Crafts catalyst, generally at −50 to 100° C. under atmospheric or increased pressure in 2–8 hours. The resultant resin from which the catalyst and solvent are removed is in oily to mass form, colourless to brown in colour. Particularly desirable resin has a molecular weight of 400–3,000, a bromine value of 10–100, and a softening point of 60–150° C., though said physical properties can be varied by the starting distillate used and polymerization conditions.

The resultant resin as above has aromatics and/or unsaturated cyclics in its molecule due to polymerization of the aromatic olefins, cyclic olefins and/or cyclic diolefins contained in the starting fraction, so that by hydrogenating part or the whole thereof, the hydrogenated hydrocarbon resin of the invention having alicyclic groups in the molecule can be obtained. In the invention it is necessary to hydrogenate the hydrocarbon resin until more than 40 percent of hydrogenation rate is secured. The higher the hydrogenation rate the better results can be obtained. If the resin tackifier of a hydrogenation rate of below 40 percent is used the adhesives poor in weather-resistance are obtained. Preferred hydrogenation rate is 60 to 100 percent.

The hydrogenation may also be carried out by the conventional methods. For instance, it is conducted by the same manner as described in U.S. Pats. Nos. 2,911,395, 2,824,860, 3,040,009, etc. Such U.S. patents concern to the hydrogenation of a hydrocarbon resin polymerized from a certain distillate consisting mainly of aliphatic components for the purpose of producing resins of lighter colour. According to the invention, by the hydrogenation not only the unsaturated aliphatic bonds in the polymer molecule are saturated but also aromatics and/or unsaturated cyclics in the molecule are converted into alicyclic groups. However, in hydrogenation the same manner as described in the references can be applied to its basic operation. For example, in a batch method, the resin is either melted or dissolved in inert solvent such as cyclohexane, paraffinic hydrocarbon fraction, etc., into which pressurized hydrogen is introduced in the presence of a suitable catalyst with stirring and heating for reaction. As the catalysts metallic catalysts such as nickel, palladium, platinum, rhodium, ruthenium, copper, cobalt, molybdenum are used. The reaction is preferably carried out under 50–500 kg./cm.$^2$ at 50–300° C. for 2 to 10 hours. It is also possible to adopt a continuous method besides the batch system as required. The hydrogenated hydrocarbon resin from which the catalyst and solvent have been removed is light yellow or colourless, and the molecular weight and softening point thereof do not markedly change by the hydrogenation. Preferred resin has a molecular weight of 400–3,000, softening point of 60–150° C. and bromine value of below 30, most desirable being one having a 600–1,500 molecular weight, 80–130° C. softening point and less than 10 bromine value.

The pressure-sensitive adhesive of the invention contains one or more of natural and synthetic rubbers in combination with the present resin tackifier. Synthetic rubbers include various elastic polymers such as styrene-butadiene rubber, acrylonitrile-butadiene rubber, polyisobutylene, isoprene-isobutylene rubber, chloroprene rubber, silicone rubber, polyvinylether, chlorinated rubber, etc. The hydocarbon resin tackifier is mixed in a proportion of 30–120 weight parts, desirable proportion being 70–100 weight parts, based on 100 weight parts of the rubber used. The hydrocarbon resin used as a tackifier in the invention has high compatibility with synthetic rubber as well as natural rubber, and produces an adhesive of excellent tackiness without the use of a plasticizer, but if required, a plasticizer may be added in a small amount, not exceeding 30 weight parts, generally 5–20 weight parts, based on 100 weight parts of the rubber being sufficient. Further a filler, ageing inhibitor, antioxidant, etc., can be also added.

According to the invention, the hydrocarbon resin tackifier can be used in combination with other publicly known tackifiers, for example, rosin, rosin ester, rosin alcohol, rosin amine, and hydrogenated products thereof, aliphatic petroleum resin and hydrogenated products thereof, terpene resin, coumaroneindene resin, etc., and particularly the hydrogenated aliphatic petroleum resin is desirable. However, in whatever case, it should be avoided to use the additional tackifier in such a large amount as more than 50 weight percent based on the combined weight of the present tackifier and the additional tackifier, as the characteristics of adhesive of the invention will be lost and the tackiness reduced. When a mixed tackifier of the hydrocarbon resin of the invention and additional tackifier is used it can be added in a proportion of 30–120 weight parts, preferably 70 to 100 weight parts, based on 100 weight parts of the rubber.

The adhesive of the invention is prepared either by mixing a tackifier and rubber with mixing roll under heat or by mixing solvent solutions of both the above materials in the conventional manner. The plasticizer and other additives may be added at the time of mixing or before it. For example, when manufacturing pressure-sensitive adhesive tape or sheet, the base material is coated with the adhesive containing the tackifier and rubber by calender or spreader, and drying under heat.

For fuller understanding of the invention examples are given below:

EXAMPLE 1

12 kg. of a petroleum fraction boiling at 20–250° C. obtained by steam cracking of petroleum was water cooled with stirring during which 120 g. of aluminum chloride powder was added dropwise in 1 hour, after the cease of exothermic reaction the system was further stirred in 3 hours at about 10° C., being water cooled. 1 liter of 5% aqueous solution of caustic soda was then added with violent stirring to decompose the catalyst, and water layer was separated. Then the reaction product was washed with water for three times, and the unreacted substance and low molecular weight polymer were removed under reduced pressure of 5 mm. Hg at 180° C., whereby a residual, 4.8 kg. of brown hydrocarbon resin was obtained.

Approximate composition of the starting fraction boiling at 20–250° C. was as follows:

|  | Wt. percent |
| --- | --- |
| Aliphatic olefins and diolefins | 14 |
| Paraffins | 12 |
| Cyclic olefins and diolefins | 7 |
| Aromatic olefins | 25 |
| Benzene and various alkylbenzene | 30 |
| Others | 12 |

50 wt. percent cyclohexane solution of the resultant hydrocarbon resin was prepared, and 150 g. of the solution was placed in a 500 cc. electromagnetic stirring autoclave, to which Raney nickel was added in an amount shown in Table 1 below. The system was stirred at 60 r.p.m. under constant conditions of hydrogen pressure of 200 kg./cm.$^2$ at 250° C. for a period specified in Table 1 below. The catalyst was removed through a glass filter from the hydrogenated solution and the filtrate was distilled under atmospheric pressure to remove cyclohexane and five different hydrogenated resins of varied hydrogenation rates were obtained.

The physical properties of these five hydrogenated resins (sample No. 1–b to 1–f) and the hydrocarbon resin before hydrogenation (sample 1–a) and the hydrogenation conditions are shown in Table 1, in which physical properties are determined by the following methods.

Colour: Gardner scale
Softening point: ASTM E28–58T
Molecular weight: Cryoscopic Method
Bromine value: ASTM: D1158–57T

TABLE 1

| Sample No. | Amount of catalyst | Reaction time (hrs.) | Hydrogenation rate (percent) | Colour | Softening point (° C.) | Molecular weight | Bromine value |
|---|---|---|---|---|---|---|---|
| 1–a | | | 0 | 13 | 95 | 960 | 39.0 |
| 1–b | 4 | 1.5 | 19.5 | 9 | 95 | 960 | 21.2 |
| 1–c | 6 | 2 | 42.5 | 5 | 95 | 940 | 15.0 |
| 1–d | 8 | 2 | 68.0 | 1 | 94 | 930 | 9.8 |
| 1–e | 10 | 2 | 91.0 | (¹) | 94 | 930 | 2.2 |
| 1–f | 20 | 4 | 100 | (¹) | 94 | 930 | 1.9 |

¹ Less than 1.

100 weight parts of the respective resin and 100 weight parts of natural rubber (Pale crepe No. 1) were dissolved in toluene to produce pressure-sensitive adhesive of a solid concentration of 20 weight percent.

The tackiness, tackiness-retentivity, adhesion and weather-resistance of the resultant adhesives were tested and determined by the following manner.

(1) Tackiness

The surface of a glass plate, 25 mm.×300 mm., was coated with the adhesive in 2 mil thickness and dried at 120° C. for 3 minutes. The coated plate thus obtained was placed in an air-conditioned room maintained at 20° C. under 65 percent RH for 1 hour.

The resultant plate coated with the adhesive was subjected to tackiness testing method described in "Test Method for Pressure-Sensitive Tapes" (published by the Specification and Technical Committee of P.S.T.C.), in which a steel ball was allowed to roll down by gravity from a point 10 cm. from the bottom of the slope at 30°, and the diameters of steel balls which stopped within 20 cm. of the horizontal surface coated with the tackifier were measured, and the maximum diameter of the steel ball thus found was used to indicate the tackiness. Therefore, the larger value thereof indicates the higher tackiness.

(2) Tackiness-rententivity

A glass plate was coated with the adhesive to be tested in 2-mil thickness and exposed to ultraviolet rays emitted from 20-w. fluorescent lamp placed 20 cm. apart from the plate. The tackiness-rententivity was determined by measuring the period when the tackiness of the adhesive was lost by the exposure to ultraviolet rays.

(3) Adhesion

Cellophane film, 15 mm.×100 mm., was coated with the adhesive to be tested in 2-mil thickness, to which glass plate was adhered. The adhesion was determined by measuring a load required for peeling off the glass plate from the cellophane film by shopper type tensile strength tester.

(4) Weather-resistance 30 weight parts of the resin to be tested, 20 weight parts of a mixture of soy bean fatty acid modified alkyd resin and titanium oxide in weight ratio of 1.5:1, 20 weight parts of toluene and 0.3 weight part of cobalt naphthenate were thoroughly mixed and the mixture was coated on a glass plate in 2-mil thickness, which was exposed to ultraviolet rays emitted from 20-w. fluorescent lamp placed 20 cm. apart from the plate. The degree of colour change to yellow was sought to determine the weather resistance.

The results are shown in Table 2 below, in which are also shown for comparative purpose the results of adhesives containing terpene resin in the place of the hydrogenated resin prepared in Example 1.

TABLE 2

| | Tackiness (mm.) | Tackiness retentivity (min.) | Adhesion (g./15 mm. width) | Weather resistance (mm.) |
|---|---|---|---|---|
| Sample No.: | | | | |
| 1–a | 7 | 40–45 | 580 | 0.400 |
| 1–b | 11 | 50–55 | 633 | 0.226 |
| 1–c | 13 | 70–75 | 700 | 0.088 |
| 1–d | 14 | 75–80 | 720 | 0.052 |
| 1–e | 16 | 85–90 | 750 | 0.039 |
| 1–f | 16 | 85–90 | 750 | 0.032 |
| Terpene resin | 13 | 70–75 | 680 | 0.189 |

Comparative example

For comparative purpose, hydrogenated resins specified in Table 3 below were prepared by the same manner as described in Example 1 below except that the following fractions prepared by mixing 3 kg. of the fraction same as in Example 1 and 7 kg. of a fraction boiling at 20–42° C. and mainly containing hydrocarbons of five carbon atoms was used as a starting distillate.

Approximate composition of the fraction:

| | Wt. percent |
|---|---|
| Aliphatic olefins and diolefins | 44 |
| Paraffins | 23 |
| Cyclic olefins and diolefins | 12 |
| Aromatic olefins | 8 |
| Benzene and various alkyl benzene | 9 |
| Others | 4 |

TABLE 3

| Sample No. | Amount of catalyst | Hydrogenation time (hrs.) | Hydrogenation rate (percent) | Colour | Softening point (° C.) | Molecular weight | Bromine value |
|---|---|---|---|---|---|---|---|
| C1–a | | | 0 | 10 | 55 | 920 | 52.8 |
| C1–b | 3 | 2 | 56.5 | 6 | 55 | 920 | 13.2 |
| C1–c | 10 | 4 | 100 | (¹) | 55 | 920 | 0.7 |

¹ Less than 1.

From the above resins pressure-sensitive adhesives were prepared by the same manner as in Example 1.

The tackiness, tackiness-retentivity, adhesion and weather-resistance of the adhesives measured by the same manners as in Example 1 are shown in Table 4 below.

TABLE 4

| | Tackiness (mm.) | Tackiness-retentivity (min.) | Adhesion (g./15 mm.) | Weather resistance |
|---|---|---|---|---|
| Sample No.: | | | | |
| C1-a | 13 | 60-65 | 510 | 0.515 |
| C1-b | 14 | 80-85 | 490 | 0.211 |
| C1-c | 15 | 95-100 | 480 | 0.050 | clave, to which 9 g. of nickel-diatomaceous earth catalyst was added, and the system was stirred at 60 r.p.m. under reaction conditions of hydrogen pressure, reaction temperature and reaction time specified in Table 5 below. The catalyst and cyclohexane were removed by the same manner as in Example 1, whereby five different hydrogenated resins of varied hydrogenation rates were obtained.

The physical properties of these five hydrogenated resins (sample 2-b to 2-f) and the hydrocarbon resin before hydrogenation (sample 1-a) and the hydrogenation conditions are shown in Table 5.

TABLE 5

| | Hydrogen pressure (kg./cm.²) | Reaction temp. (° C.) | Reaction period (hrs.) | Hydrogenation rate (percent) | Colour | Softening point (° C.) | Molecular weight | Bromine value |
|---|---|---|---|---|---|---|---|---|
| Sample No.: | | | | | | | | |
| 2-a | | | | 0 | 14 | 124 | 840 | 35.0 |
| 2-b | 50 | 150 | 2 | 20.5 | 11 | 124 | 840 | 15.3 |
| 2-c | 100 | 150 | 3 | 44.0 | 6 | 123 | 830 | 6.9 |
| 2-d | 150 | 200 | 3 | 66.5 | 1 | 121 | 800 | 5.3 |
| 2-e | 200 | 200 | 4 | 81.5 | (¹) | 121 | 800 | 3.8 |
| 2-f | 300 | 250 | 5 | 97.0 | (¹) | 122 | 800 | 2.5 |

¹ Less than 1.

EXAMPLE 2

12 kg. of a petroleum fraction boiling at 140–200° C. obtained by steam-cracking of petroleum naphtha was water-cooled with stirring during which 120 g. of boron trifluoride-ether complex compound was added dropwise. For 3 hours after the completion of the addition and after the cease of exothermic reaction the system was further stirred at room temperature of 25° C. 1 liter of 5% aqueous solution of caustic soda was then added with violent stirring to decompose the catalyst, and water layer was separated therefrom. Then the reaction product was washed with water for three times, and distilled to remove the unreacted substances and low molecular weight polymer.

As a residue was obtained 0.7 kg. of brown mass of a hydrocarbon resin. The approximate composition of the starting distillate was as described below:

|  | Wt. percent |
|---|---|
| Styrene | 2 |
| α-methylstyrene | 5 |
| Vinyltoluene | 18 |
| Indene | 11 |
| Dicyclopentadiene | 2 |
| Ethylbenzene | 2 |
| Xylene | 4 |
| Trimethylbenzene | 24 |
| n-propylbenzene | 13 |
| Diethylbenzene | 4 |
| Others | 15 |

50 wt. percent cyclohexane solution of the resultant hydrocarbon resin was prepared, and 150 g. of the solution was placed in a 500-cc. electromagnetic stirring auto- From the above resins pressure-sensitive adhesives were prepared by the same manner as in Example 1, and the tackiness, tackiness-retentivity, adhesion and weather-resistance of the adhesives measured by the same manners as in Example 1 are shown in Table 6 below.

TABLE 6

| | Tackiness (mm.) | Tackiness-retentivity (min.) | Adhesion (g./15 mm.) | Weather resistance |
|---|---|---|---|---|
| Sample No.: | | | | |
| 2-a | 7 | 35-40 | 550 | 0.482 |
| 2-b | 11 | 55-60 | 600 | 0.270 |
| 2-c | 13 | 75-80 | 670 | 0.135 |
| 2-d | 14 | 80-85 | 720 | 0.103 |
| 2-e | 16 | 85-90 | 760 | 0.050 |
| 2-f | 17 | 90-95 | 760 | 0.027 |

EXAMPLE 3

The hydrogenated resin (sample No. 2-f) of 97.0% hydrogenation rate prepared in Example 2 was mixed in various proportions specified in Table 7 below with pentaelisritol ester of rosin having softening point of 102° C., molecular weight of 620 and bromine value of 27.9, and 100 weight parts of the mixture and 100 weight parts of natural rubber (Pale crepe No. 1) were dissolved in toluene to produce pressure-sensitive adhesives of a 20 wt. percent solid concentration.

The tackiness, tackiness-retentivity and adhesion of the resultant adhesives measured by the same manners as in Example 1 are shown in Table 7.

TABLE 7

| | Mixing proportion in weight | | | | | |
|---|---|---|---|---|---|---|
| | Hydrogenated resin (sample No. 2-f) | Rosin ester | Tackiness (mm.) | Tackiness-retentivity (min.) | Adhesion (g./15 mm.) | Weather-resistance |
| Sample No.: | | | | | | |
| 3-a | 0 | 100 | 13 | 45-70 | 650 | 0.210 |
| 3-b | 30 | 70 | 13 | 60-65 | 670 | 0.129 |
| 3-c | 50 | 50 | 15 | 75-80 | 700 | 0.071 |
| 3-d | 70 | 30 | 16 | 80-85 | 720 | 0.054 |
| 3-e | 90 | 10 | 17 | 85-90 | 750 | 0.037 |

EXAMPLE 4

The same hydrogenated resin (Sample No. 2-f) as that used in Example 3 was mixed in various proportions specified in Table 8 with a hydrogenated aliphatic hydrocarbon resin having softening point of 97° C. molecular weight of 1,200 and bromine value of 21.9. 100 weight parts of the respective mixtures, 100 weight parts of 1:1 weight mixture of natural rubber (Pale crepe No. 1) and styrene-butadiene rubber and 20 weight parts of dioctyl phthalate were dissolved in toluene to produce a pressure-sensitive adhesive of a 20 wt. percent solid concentration.

TABLE 8

| Sample No. | Mixing proportions in weight | | Tackiness (mm.) | Tackiness-retentivity (min.) | Adhesion (g./15 mm.) | Weather resistance |
|---|---|---|---|---|---|---|
| | Hydrogenated resin (sample No. 2-f) | Hydrogenated aliphatic hydrocarbon resin | | | | |
| 4-a | 0 | 100 | 12 | 70-75 | 600 | 0.102 |
| 4-b | 30 | 70 | 12 | 70-75 | 620 | 0.079 |
| 4-c | 50 | 50 | 14 | 75-80 | 650 | 0.060 |
| 4-d | 70 | 30 | 15 | 80-85 | 670 | 0.044 |
| 4-e | 90 | 10 | 16 | 85-90 | 680 | 0.032 |

What we claim is:

1. A pressure-sensitive adhesive which consists essentially of 100 weight parts of at least one of natural rubber and synthetic rubber selected from the group consisting of styrene-butadiene rubber, acrylonitrile-butadiene rubber, polyisobutylene rubber, isoprene-isobutylene rubber, chloroprene rubber, silicone rubber, polyvinyl ether, and chlorinated rubber, and 30 to 120 weight parts of a hydrogenated hydrocarbon resin tackifier having a molecular weight between 400-3,000, a softening point between 60 and 150° C., and a bromine value of less than 30, and being prepared by polymerizing a cracked petroleum fraction, boiling between −10 and 280° C. and containing unsaturated hydrocarbons at least 50 weight percent of which is at least one of aromatic olefins, cyclic olefins and cyclic diolefins, and hydrogenating the resultant polymer to a hydrogenation rate of at least 40 percent.

2. The pressure-sensitive adhesive according to claim 1, in which said hydrogenated hydrocarbon resin tackifier is prepared by polymerizing a cracked petroleum fraction boiling between 130 to 280° C. and containing unsaturated hydrocarbons 60 to 100 weight percent of which is at least one of aromatic olefins, cyclic olefins and cyclic diolefins and hydrogenating the resultant polymer to a hydrogenation rate of at least 40 percent.

3. The pressure-sensitive adhesive according to claim 2, in which said hydrogenated hydrocarbon resin has a hydrogenation rate of 60 to 100 percent.

4. The pressure-sensitive adhesive according to claim 1, in which said hydrogenated hydrocarbon resin tackifier is contained in the range of 70 to 100 weight parts, based on 100 weight parts of the rubber.

5. The pressure-sensitive adhesive according to claim 1, in which said hydrogenated hydrocarbon resin tackifier is used in combination with at least one additional tackifier selected from the group consisting of rosin, rosin ester, hydrogenated rosin, hydrogenated rosin ester, rosin alcohol, rosin amine, terpene resin, coumarone-indene resin, aliphatic hydrocarbon resin and hydrogenated aliphatic hydrocarbon resin.

6. The pressure-sensitive adhesive according to claim 5, in which said additional tackifier is the hydrogenated aliphatic hydrocarbon resin.

7. The pressure-sensitive adhesive according to claim 5, in which said additional tackifier is used in the order of less than 50 weight percent, based on the total weight of the combined tackifier.

References Cited

UNITED STATES PATENTS

| 3,015,638 | 1/1962 | Sergi | 260—5 |
| 3,242,110 | 3/1966 | Korpman | 260—5 |
| 3,243,390 | 3/1966 | Hillard et al. | 260—82 |
| 3,442,877 | 5/1969 | Moritz et al. | 260—82 |

FOREIGN PATENTS

| 879,134 | 10/1961 | Great Britain | 260—5 |

MURRAY TILLMAN, Primary Examiner

M. J. TULLY, Assistant Examiner

U.S. Cl. X.R.

260—4, 27, 33.6, 82, 827, 874, 887, 888, 889, 894, 892